Nov. 14, 1972   G. R. CUNNINGHAM ET AL   3,702,657
POLLUTION CONTAINMENT BARRIER
Filed Feb. 11, 1971   2 Sheets-Sheet 1

INVENTORS.
GERALD R. CUNNINGHAM,
LEMUEL D. WOODDY, JR.,
BY
John N Schneider
ATTORNEY.

United States Patent Office 3,702,657
Patented Nov. 14, 1972

3,702,657
POLLUTION CONTAINMENT BARRIER
Gerald Robert Cunningham, Santa Monica, Calif., and Lemuel Dale Woody, Jr., Houston, Tex., assignors to Esso Production Research Company
Filed Feb. 11, 1971, Ser. No. 114,553
Int. Cl. E02b *15/04*
U.S. Cl. 210—242
3 Claims

ABSTRACT OF THE DISCLOSURE

A flow-through pollution containment barrier for the control and removal of potential oil spill hazards in a water environment includes a series of cages linked together. Oil sorbent buoyant material, capable of allowing water to pass freely through it while remaining oil wet when contacted by an oil water mixture is removably arranged in each cage. Liquid impervious material is arranged in the spaces at the joints between the cages to prevent passage of liquid therethrough. Each cage is weighted in order to maintain a predetermined submergence of the cage in a body of water.

BACKGROUND OF THE INVENTION

The present invention concerns flow-through type barrier apparatus to facilitate disposal of oil on bodies of water and to prevent contamination of shorelines. During normal marine oil well drilling and/or oil production operations the possibility exists for hydrocarbons which are immiscible with and lighter than water to commingle with the water body. When this occurs, failure to maintain or remove the hydrocarbons, which will float as a film upon the water, jeopardizes by contamination the water body and shore environment. Efforts to separate the hydrocarbons from the water are complicated by both the reduced thickness of the oil film which is formed and wave action. The apparatus of the present invention is designed to contain and remove such an oil accumulation on a water surface and prevent spreading of the accumulated oil to the shoreline. This apparatus removes the oil without use of other pollution control devices such as dispersants, sinkants, biodegradants, gellants, unconfined sorbents and/or nonflow-through barrier devices. The latter has been shown to be substantially ineffective in open sea conditions and even if such barriers could be modified to control successfully an open sea oil spill, they must be supplemented with an independent clean-up operation.

The present invention provides a barrier system which is applicable for all water environments. It incorporates the principles of containment and removal of the pollutant material and can be installed in operational areas without interference to operations being conducted and can survive for long periods of time without maintenance or replacement of component parts. Water forces will not be resisted as in a nonflow-through type barrier. Rather, the water will be allowed to freely pass through the containment apparatus. The sorbent material provides buoyancy for the barrier system and for the free passage of the water flow and for the oil sorbent properties necessary to remove the oil from the fluid as it flows through the barrier.

SUMMARY OF THE INVENTION

A flow-through pollution containment barrier which includes a series of cages linked together. Oil sorbent buoyant material arranged in each cage is capable of allowing water to pass freely through the material while remaining oil wet when contacted by a water mixture. The spaces between the cages are closed off by liquid impervious flexible members. Weighting means are provided to maintain a predetermined submergence of the cages in a body of water.

DETAILED DESCRIPTION OF THE INVENTION

Figure 1:
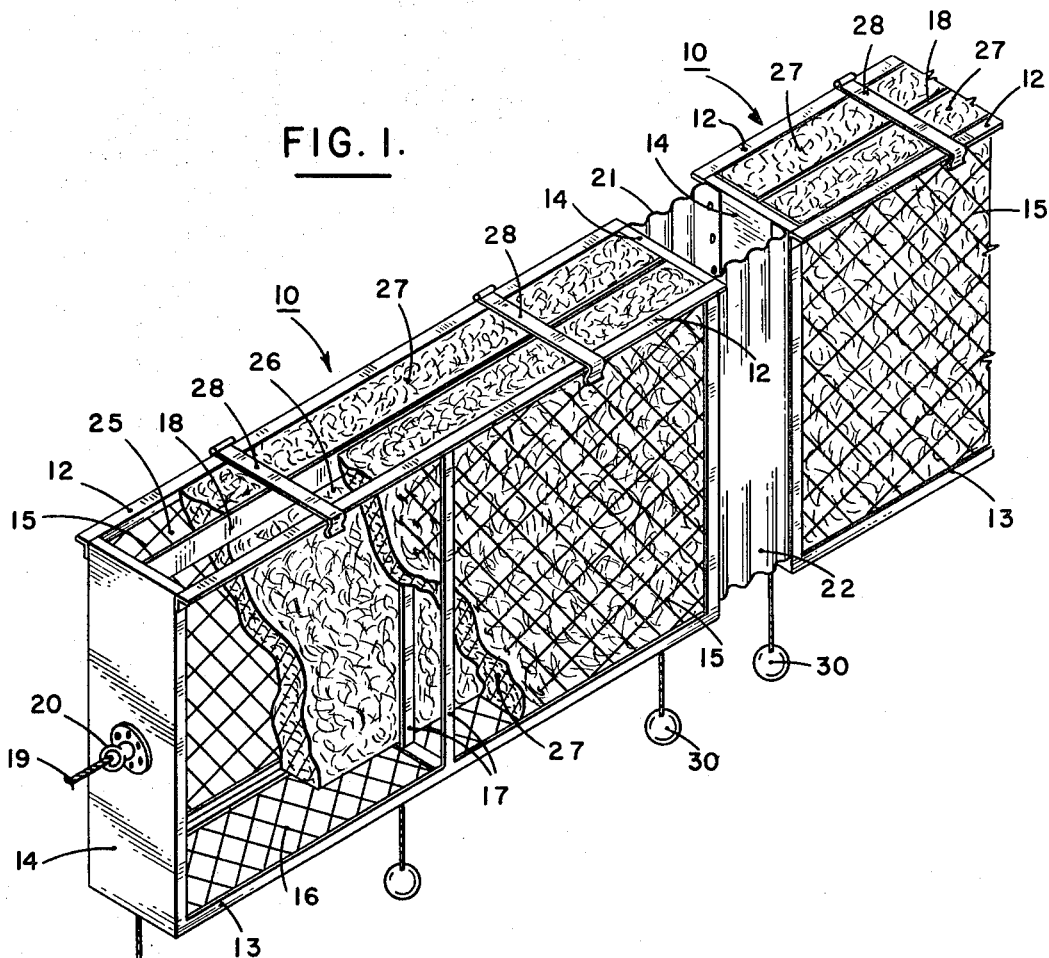
FIG. 1 illustrates details of a portion of the barrier of the invention.

Referring to FIG. 1 there is shown two rectangularly or box-shaped cages 10 formed by upper and lower side rim members 12 and 13, respectively, solid end panels 14, wire mesh or screen sides 15 and bottom 16, center vertically extending slats 17 and horizontally extending upper slats 18. The cages are connected together by a flexible wireline and socket arrangement 19, 20. The sockets are connected to end panels 14. Two flexible membranes 21 and 22 formed of liquid impervious material close off the space between cages 10 to the passage of liquid therethrough. The interior of each cage 10 is divided into two slots or compartments 25 and 26 which extend the length of the cage. An oil sorbent buoyant bag or pad 27 is positioned in each compartment. Hinged snap latches 28 are arranged to connect with the upper rim members 12 to retain the pads in their compartments. Weights 30 maintain desired submergence of the barrier device in the water. The weight requirements could otherwise be satisfied by a skidding system which would also facilitate handling and installation from a land site.

The pads of sorbent material may be removed and replaced by removing the snap latches 28 or other lid arrangement which may be provided to aid in containing the sorbent material. The individual cage dimensions are limited only by the fabrication material sizes. The required submergence, area of exposure and thickness of sorbent material necessary would be designed in accordance with the particular use for the barrier.

Each individual cage consists of a minimum of two compartments oriented such that as one bag of sorbent material is being removed and replaced, the second compartment with its bag of sorbent material remains as an effective flow-through barrier. Sorbent bag size is limited only by the ability of equipment to pick up a soaked bag weight and place the bag on a boat or barge for disposal or reclamation. Sorbent materials suitable for use are those having a cellular structure sufficiently open to allow water to pass freely and yet remain oil wet (oleophilic) when contacted by an oil-water mixture. Examples, of such materials are the generic polymers, such as the polyester, polyethyl and polyurethane foams. Such foam materials have proven durability characteristics in a water environment. The series of cages forms an articulated boom system. The joints between the cages consisting of the pseudouniversal joint arrangement allows a sufficient degree of flexibility in responding to wave or current imposed boom orientations without excessive flexural stressing of the cages. The impervious membrane inserts at the joints makes the joint a nonflow region, forcing flow through the cages.

Additional external and/or internal sorbent material bags or units might be used. The sorbent material would provide the necessary buoyancy. Each unit would be sized sufficiently such that when all but a single bag or unit is removed for a changeout of the sorbent material, sufficient buoyancy would still exist to support the cage assembly.

Figure 3:
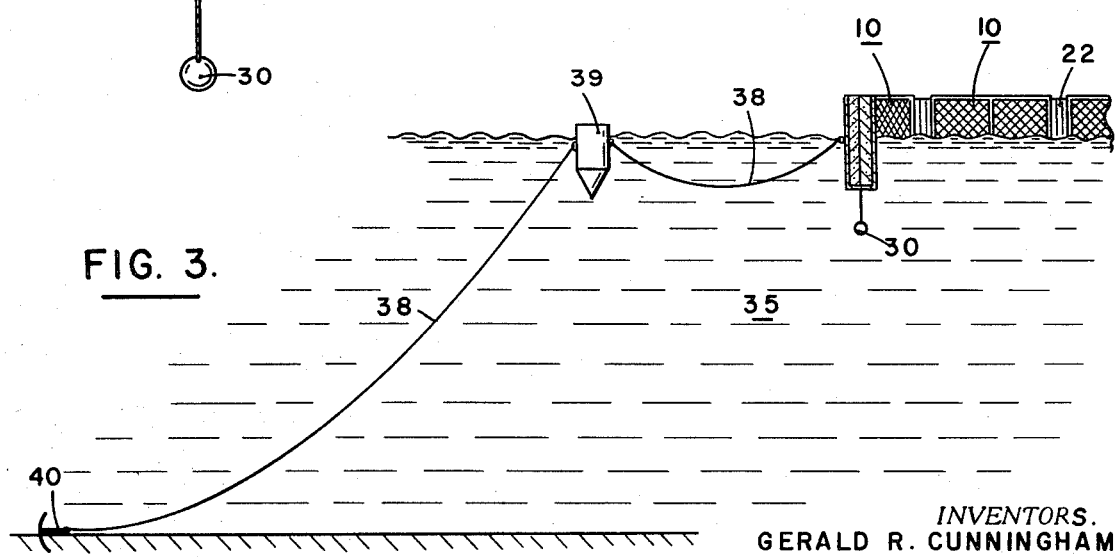
FIG. 3 is a view taken along lines 3—3 of FIG. 2.
Figure 2:
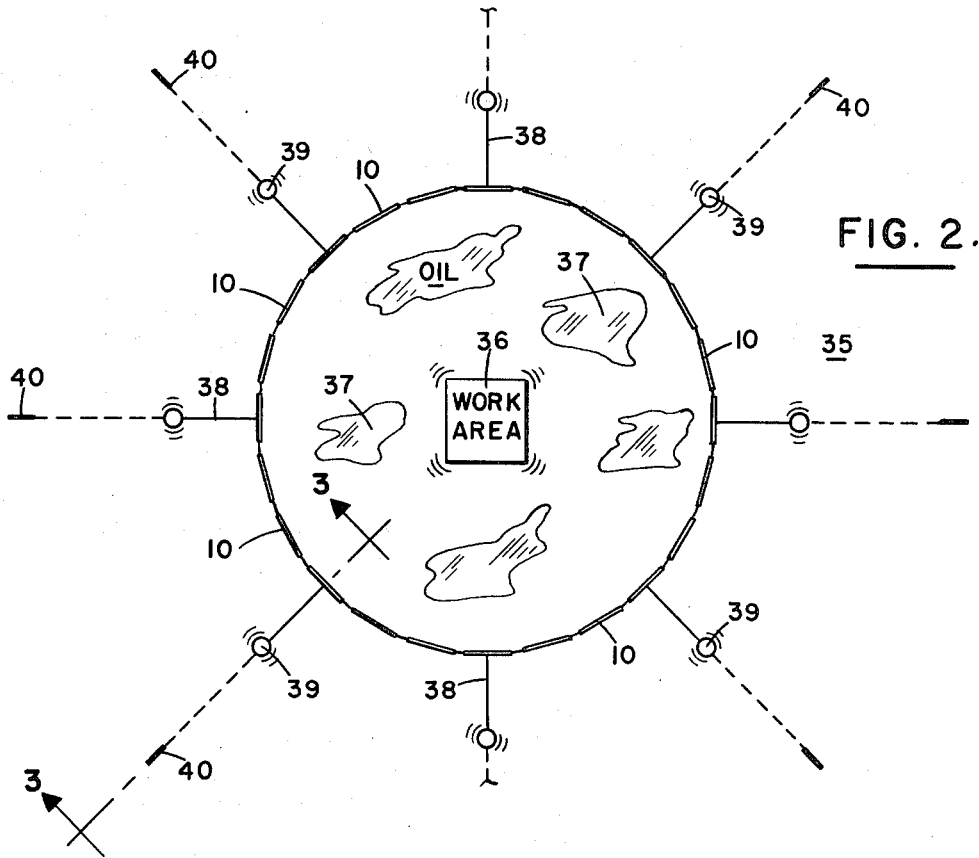
FIG. 2 illustrates the barrier arranged in a circular pattern around an offshore platform.

In FIG. 2 the cages 10 are shown arranged in a circular pattern in a body of water 35 surrounding an offshore platform 36 within which oil spills designated as 37 are cointained. The cages are maintained in position by the cables 38 which connect selected cages 10 to buoys 39 which in turn are connected to anchors 40 as shown also in FIG. 3.

Figure 4:
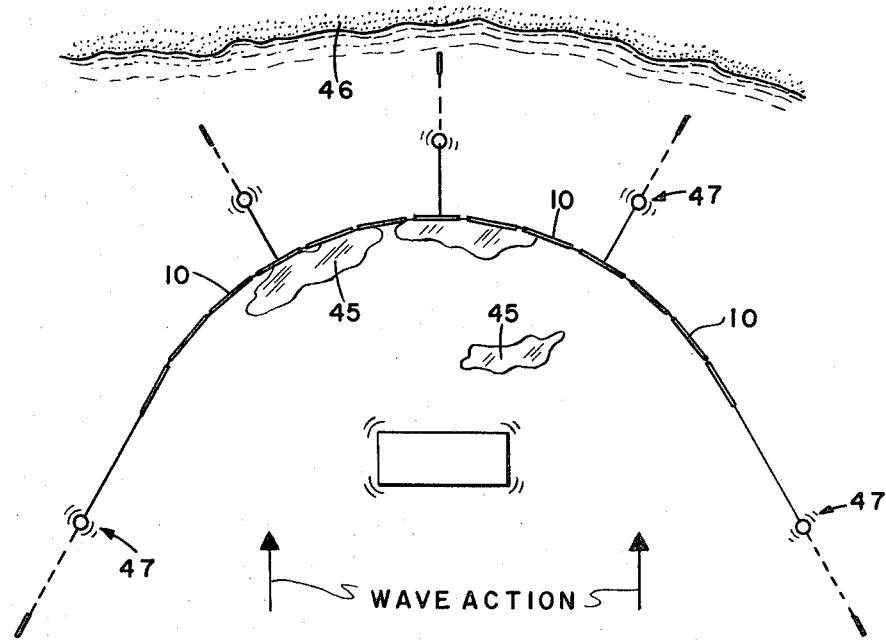
FIG. 4 illustrates the barrier arranged in a modified pattern adjacent an offshore platform.

In FIG. 4, a somewhat different arrangement is shown in which the cages are arranged in a semicircular pattern to prevent the oil spills 45 from penetrating to the shoreline designated 46. The series of cages 10 are maintained in position by cables, buoys and anchors generally designated 47.

The cages may be fabricated from steel or other desired materials. End panels 14 may be made of wire mesh or other open type wall rather than the solid wall shown. The open bottom 16 and the open top of cage 10 might be screened. Also the top might be closed instead of open with the upper end having an openable lid to permit insertion and removal of pads 27; however, an open top is preferred to catch splashover contents. A short rigid member with universal joints could be used instead of the flexible wireline and socket arrangement 19, 20. With an appropriate anchoring system attached to this articulated boom system the pollution control barrier described herein could be installed in any water environment operational area to provide a safety factor against potential oil spill hazards resulting from operations. It would preferably be in place prior to any potential need. Minimum maintenance would be required under normal circumstances and the barrier would be available as a containment/clean-up device at the time of need.

Having fully described the apparatus, advantages, and operation of our invention, we claim:

1. A flow-through pollution containment barrier for use in a body of water comprising:

a series of spaced apart cages forming an articulated boom;

liquid impervious flexible membranes connected to the ends of said cages and closing off the spaces between the cages to passage of liquid;

flexible joint means connecting the ends of said cages to each other;

oil absorbent buoyant material arranged in each cage and capable of allowing water to pass freely therethrough and of remaining oil wet when contacted by an oil-water mixture;

weighting means to maintain a predetermined submergence of a portion of each cage in said body of water;

each cage being generally rectangularly shaped, and containing at least two compartments each of which extends the length of said cage;

each cage containing at least two removable units of said oil absorbent material; and each unit being of sufficient size and containing sufficient buoyant material to float said cage in which it is contained in said water.

2. A barrier as recited in claim 1 in which the top of each cage is open.

3. A barrier as recited in claim 2 in which the sides and bottom of each cage are screened.

References Cited
UNITED STATES PATENTS 3,537,587 11/1970 Kain _____ 61—1 F
3,584,462 6/1971 Gadd _____ 210—170 X SAMIH N. ZAHARNA, Primary Examiner U.S. Cl. X.R.

61—1 F; 210—DIG 21